Patented Jan. 22, 1929.

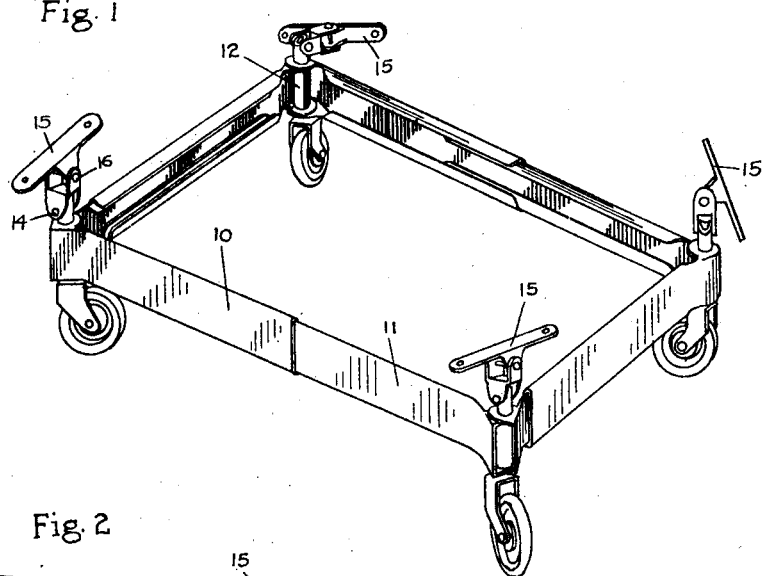
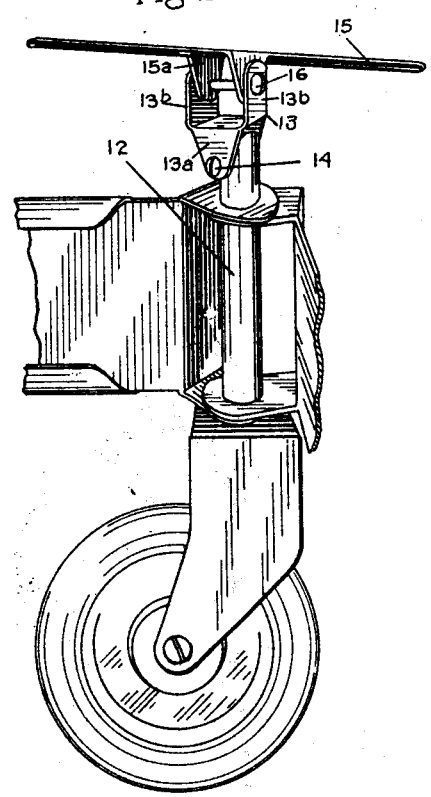
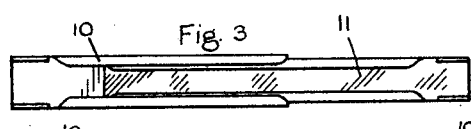
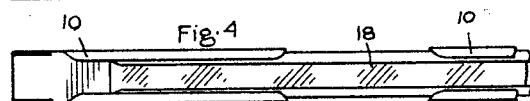
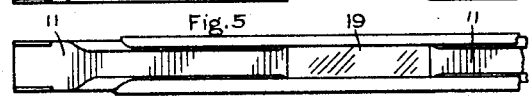

1,700,009

UNITED STATES PATENT OFFICE.

ERNEST ALFRED WILLNER, SR., OF LINCOLN, NEBRASKA.

INVALID-CHAIR TRUCK.

Application filed February 13, 1928. Serial No. 253,953.

My invention relates to invalid chair trucks and its primary object is the provision of a truck which may be secured to any chair for converting the chair into a wheel chair.

Another object which I have in view is the provision of a truck having a quadrilateral form which may be adjusted both in size and shape.

Another of my objects is the provision of attaching plates which are connected to the truck by means of universal joints so that the plates may be made to assume any position to fit the article of furniture to which the truck is to be secured.

Still another object of my invention is the provision of expanding members which may be secured to the side members of the truck so as to increase the side members to a length such that the truck may be used for supporting a bed or other large piece of furniture.

Having in view these objects and others which will be pointed out in the following description, I will now refer to the drawings, in which Figure 1 is a view in perspective of the invalid chair truck.

Figure 2 is a view partly in perspective and partly in section of one of the corner structures of the truck.

Figures 3, 4 and 5 are three views showing the use of extensible members for lengthening the side members of the truck.

The invalid chair truck includes a quadrilateral frame which is supported at its corners on caster wheels, the supports for the caster wheels being pivotally connected to the frame members. Each side member of the frame includes two channel members 10 and 11, the channel member 10 being larger than 11 and of a size to slidably receive the member 11. At each corner of the truck the side members are both pivotally connected to the collar 12 which receives the caster wheel spindle. It will be readily apparent that each of the four sides of the frame is expansible and contractible and that the frame may be adjusted to other forms than the rectangular.

The spindle of the caster wheel enters the vertical sleeve 12 and it is provided with ball bearings or other antifriction devices. The collars 12 are provided with abutments to prevent the sliding movement between the collars and the side members of the frame. At the upper extremity of each collar 12 there is secured a joint member 13 having two downturned ears 13$^a$ and two upturned ears 13$^b$, the ears 13$^a$ and 13$^b$ being in planes which are perpendicular to each other. The joint member 13 is connected to the sleeve 12 at its upper extremity by means of a bolt 14 or other similar pivot pin passing through the ears 13$^a$. The plate member 15 is provided with two ears 15$^a$ which are pivotally connected by means of a bolt 16 or the like to the ears 13$^b$ as shown in Figure 2. This construction affords a universal joint between the plates 15 and the supporting members 12 so that the plates 15 may be made to assume a position in any desired plane. Each of the plates is provided with apertures whereby it may be secured to the chair, the adjustment of the plate about its pivots 14 and 16 being such that the plate may be brought into close contact with any surface of the chair regardless of its inclination. Where the chair legs are sufficiently wide as in morris chairs, the plate may be in the horizontal position. When the chair has narrow vertical legs, the plate must be in its vertical position and it may be turned on its axis so as to bring it into close contact with any desired side of the chair leg. If the chair has inclined flat surfaces to which it is desired to secure the truck it is only necessary to turn the plate about its vertical axis and to adjust it about its pivots 14 and 16 to bring it into the desired position and at the desired angle.

It occasionally becomes desirable that larger objects than chairs be secured to trucks. I have therefore provided means for altering the lengths of the side members so that the truck may be secured to larger objects such as beds. The side members are detachable from the supports 12 so that when such adjustment is desired, the members 10 and 11 of the sides may be rearranged to accommodate the extension members. In Figure 3 the view shows the arrangement of members 10 and 11 as shown in Figure 1. The extension members which I employ are shown at 18 in Figure 4 and at 19 in Figure 5. The width of the extension member 18 is the same as that of the side member 11 and the width of the extension member 19 is the same as that of the member 10. By rearranging the members 10 and 11 so that like members appear on the same side of the frame, it is possible to insert an extension member as shown in Figures 4 and 5 in order to lengthen the side of the truck frame.

Having thus described my invention in such full, clear, and exact terms that its construction and operation will be readily understood by others skilled in the art to which it pertains, what I claim as new and desire to secure by Letters Patent of the United States is:

1. A wheel supported furniture truck of polygonal form having plates at the corners of said truck for attachment to an article of furniture, said plates being secured to said truck by means of universal joints whereby said plates may be adjusted in position to any desired plane.

2. A furniture truck of polygonal form having vertical pivot pins connecting the side members of said truck at the meeting ends thereof, said pivot pins being provided at their lower extremities with supporting wheels, plates for attachment to an article of furniture, and universal joints connecting said plates to said pivot pins at the upper extremities thereof.

3. A furniture truck having four sides pivotally connected together in quadrilateral form, each of said sides being extensible and contractible whereby said truck may be adjusted to any desired quadrilateral form or size, and plates at the corners of said truck for attachment to an article of furniture, said plates being secured to said truck by means of universal joints whereby said plates may be adjusted in position to any desired plane.

4. A furniture truck having four sides pivotally connected together in quadrilateral form, each of said sides consisting of a plurality of slidably connected members whereby said truck may be adjusted to any desired quadrilateral form or size, and plates at the corners of said truck for attachment to an article of furniture, said plates being secured to said truck by means of universal joints whereby said plates may be adjusted in position to any desired plane.

In testimony whereof I affix my signature.

ERNEST ALFRED WILLNER, Sr.